Dec. 13, 1966    C. L. PETERSON    3,291,312
DISC FILTER ASSEMBLY
Filed May 27, 1963    3 Sheets-Sheet 1

INVENTOR.
C. Lynn Peterson
BY
ATTORNEYS

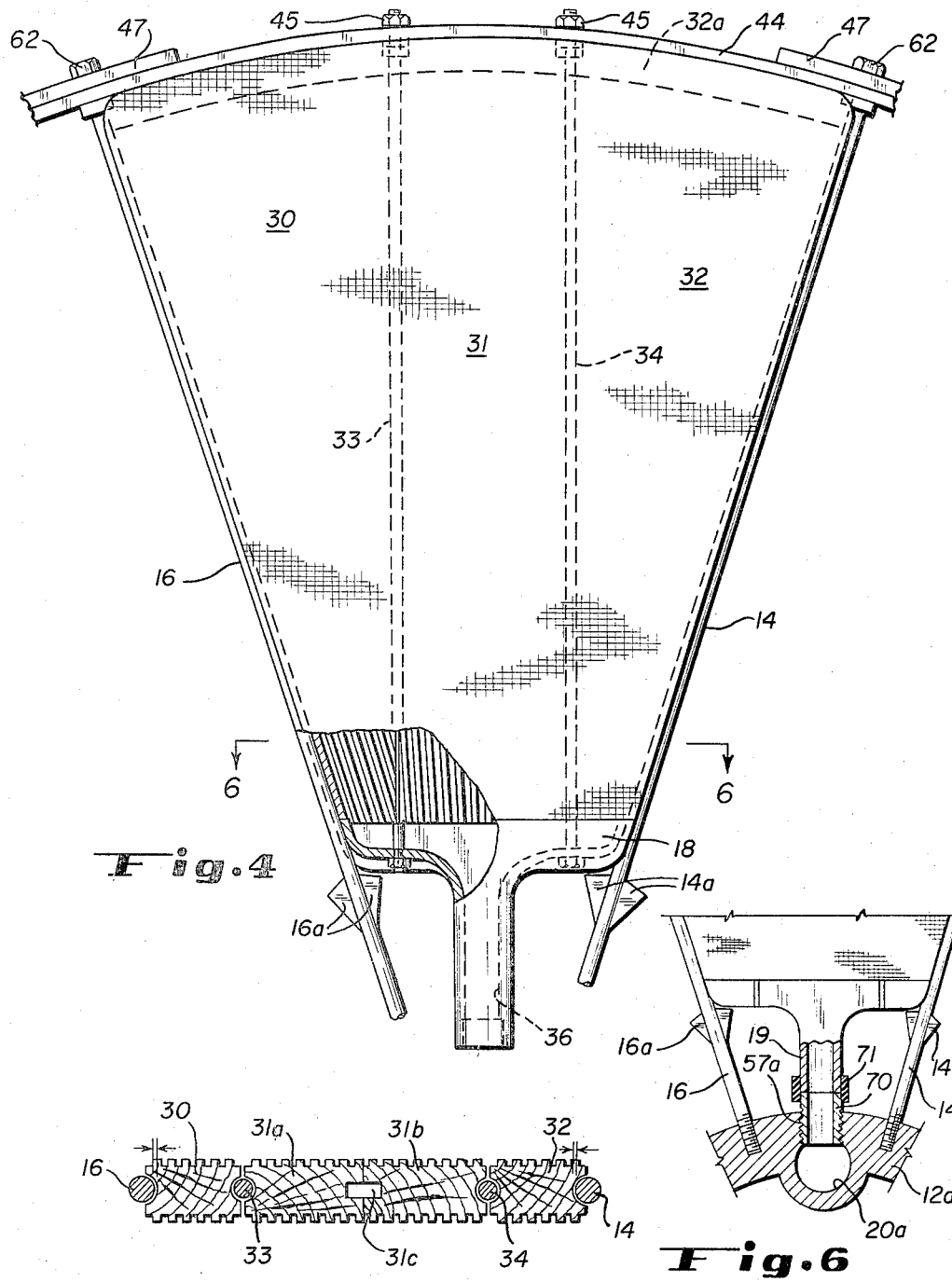

INVENTOR.
C. Lynn Peterson

United States Patent Office 3,291,312
Patented Dec. 13, 1966

3,291,312
DISC FILTER ASSEMBLY
C. Lynn Peterson, Salt Lake City, Utah, assignor to Peterson Filters & Engineering Company, Salt Lake City, Utah, a corporation of Utah
Filed May 27, 1963, Ser. No. 283,188
9 Claims. (Cl. 210—345)

This invention relates to disc filters and more particularly to a sector assembly for a disc filter which provides a non-compressive mounting of such an assembly with a filter shaft while maintaining a positive seal with the associated filter shaft.

Disc filters are common in the filtration art, and the normal construction of a disc filter includes a series of thin, circular disc-like members secured at rather close intervals along a shaft. Each disc is generally composed of a series of segments or sectors (8, 10 or more) which are individually covered with filter medium to provide filtering on both sides. Each sector of each disc is individually attached to the filter shaft, and individually to one of a series of passages in the shaft for vacuum and cake discharge pressure for the filtration. Commercially, such filters are of rather large dimensions and the individual sectors are made of several parts held together by sector rods, and the sectors are held in position on the shaft by radial rods. These rods are threadedly attached to the shaft on their inner end, and a sector clamp is used at the outer end of the rods to hold the sectors. By pulling down on a nut against the sector clamp the sector may be pulled up tight on the shaft to form a hermetic seal with a flat compressive gasket for the filtering operation.

In one form, the individual sector may consist of a segmented wooden body having a plurality of grooves on each side to provide for the flow of fluid. The parts of sector body are secured together and held in a hollow sector bell which includes a passage for communication with the fluid lines in the shaft. Where the sector body is made of wood, the sector bell is normally made of metal for strength. The segmented wooden sector body is assembled as a unit to the bell by means of sector rods and a cap. Filter medium is placed around the sector body, and the sector is mounted on the shaft with its neighbors to form the disc or leaf.

Wooden sector bodies are of value since they are inexpensive to produce, they are lighter than most metals, and they resist corrosion under most filtration environments. The wood is generally installed dry and it swells when it is soaked with the fluid of the slurry. Under conventional practices a flat gasket is placed between the sector and shaft, the sectors are pulled down tight against the shaft by the radial rods to effect a compressive seal between the sector bell neck and the shaft. The sector body, also, is pulled tight on the sector bell by the sector rods. If correctly installed there may not be too much radial pressure on sector body initially when the wood is dry, but pressure increases sufficiently to interfere with the swelling of the wood when it becomes wet. The swelling of the wood may be detrimental if it is confined by the pressure exerted from the radial rods since the wood warps distorting the symmetry of the discs and the smooth lay of the wire or filter media.

One real problem encountered in the employment of disc filters is proper installation of the sectors on the shaft. Filter media wears out, breaks occur, and many other events necessitate dressing the filter in its installed location. This means that workers other than the actual disc filter manufacturers usually dress the sectors and install them in the unit. The filters are big, but are built to close tolerances which requires careful installation, and generally some readjustment after operation has commenced to compensate for expansion where wooden members are used.

Conventionally, mounting a sector on the shaft requires a flat compressive gasket to form a seal between the sector neck and the shaft. The geometry and dimensions of the disc filter does not permit the operator to inspect the connection at close range, so as to insure a tight seal, and thus there is a tendency for the installer to initially pull the sector too tight. The sectors must be constructed to withstand these rather large radial pressures. Also, where the first sectors are pulled down too tightly before all sectors of each disc are in place on the shaft, insufficient room is left causing warped discs. Swelling of wooden sectors or pulling down too tightly on plastic or metal sectors causes distortion of the sectors which may buckle the wire mesh filter medium, particularly in the area just above the sector bell. This buckled wire mesh has a substantially shortened life requiring premature redressing the filter. The common practice of pulling the sectors too tight in dressing a filter may reduce the life of the filter medium to less than a fourth the useful life of correctly positioned and tightened sectors.

According to the present invention, I provide means for mounting individual sectors in proper position on a filter shaft, with the sector bell fully sealed to the shaft with minimum compressive forces on the sector. Clearance is provided which permits wooden sectors to swell in unconfined space. The sector is mounted in sealed position with the shaft but is permitted limited movement within stops to thereby permit a free swelling of the wood without interference by the metal rods and framed holding such sectors. The mounting assembly permits the use of lighter sectors since high compressive forces are not needed to seal the sector to the shaft.

Included among the objects and advantages of the present invention is an assembly and a mounting for filter sectors without compression forces to hold the assembly and make a seal at the center shaft.

Another object of the invention is to provide mounting means for light weight metal or plastic sectors eliminating high compressing forces which tend to buckle wire mesh filter medium and maintain the seal between the sector and the shaft.

Another object of the invention is to provide means mounting a filter sector without excessive radial compressive forces which permits the use of lighter weight materials for making the sector assemblies, and which provides a positive seal between the filter shaft and individual sectors without radial forces.

A further object of the invention is a light weight sector of plastic or synthetic resin material which supports a filter medium for effective filtering operation and which may be mounted on a shaft and sealed without radial compressive forces.

These and other objects and advantages of the invention may be readily ascertained by referring to the following description and appended illustrations in which:

FIG. 4 is a composite view of a sector in partially assembled position ready for installation on a disc filter shaft;

FIG. 5 is a cross-sectional view of a sector body taken along line 6—6 of FIG. 4;

FIG. 6 is a detail of a modified connection between the neck of a sector bell and a shaft;

The invention has particular application to the mounting of sector bodies which are not capable of supporting high radial forces. Such sectors as are made of plastic, thin gauge metals, and the like cannot tolerate the compressive forces necessary to seal against a conventional flat gasket mounted between the sector and the shaft. For description of one application of the invention a wooden body sector is illustrated, but the mounting is not dependent on the sector body. The seal assembly and radial rods for holding the sector are suitable for the plastic, thin gauge metal, etc. sectors subsequently described. Further, conventional high strength sector bells may be used without modification since in one form peripheral sealing means are provided for use on the neck of the sector bell for sealing it to an attachment for the shaft. Thus light weight plastic, thin gauge metal, etc. sector bells may be used with the light weight sector body members as well as conventional sector bodies. With the invention, the members of the sector must only be able to withstand the forces exerted by the vacuum and blow-back, but not compressive radial sealing forces.

Figure 1:
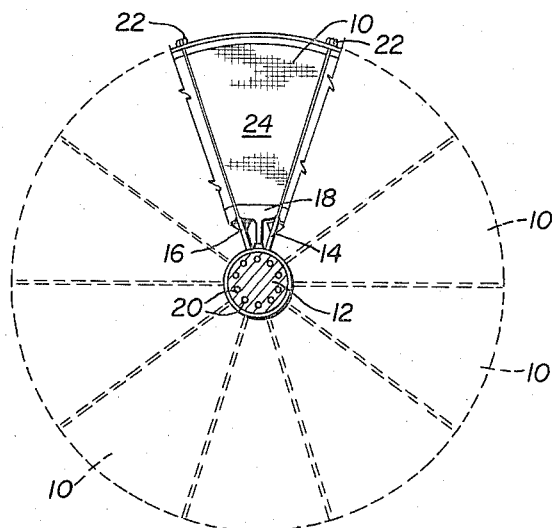
FIG. 1 is a partial view showing schematically an arrangement of a sector and its positioning on a shaft to form a portion of a disc filter.

As shown in FIG. 1, a filter disc in dashed lines, indicates how a plurality of sectors 10 form such a disc, only one of which is shown, by being secured in side by side relation to a shaft 12 by means of sector rods 14 and 16. Each sector includes a hollow sector bell 18 which is mounted on the shaft and communicated with lines 20 internally of the shaft for providing suction and/or air pressure as may be desired. The radial rods are threadedly attached to the shaft and the outer end of each is provided with a nut 22 for holding the sectors in place.

The plurality of such sectors are provided in side by side relation to form the complete circumferential disc around the shaft. For larger sizes, a sector covering about 36° of rotation has been found satisfactory, so that ten sectors are required to form a complete disc. Each sector of course is covered by a filter medium 24 which may be cloth, wire cloth, perforated plate, or the like. In each case the individual sector is a complete filtering unit when attached to the shaft.

A typical section of a wooden sector is illustrated in FIGS. 4 and 5 where the sector consists of a center body 31a and 31b joined together by a tongue 31c, two side portions 30 and 32 and a top piece or a cap 32a. The center body and side portions are arranged in side by side relation and mounted in a sector bell 18. These joined portions are held together by means of sector rods 33 and 34 which in turn are secured to the sector bell 18. The sectors are provided with a plurality of grooves, as is common practice, for the flow of fluid down the sector to the passage 36 in the bell, which passage communicates with one of the passages 20 in the shaft. A filter medium body 24 is mounted over at least the filtering portions of the sector. The sector is then placed in position on the shaft and held in position by the rods 16 and 14.

The separate portions of the sector body are secured to the bell by means of the rods 33 and 34, the details of which are shown in FIG. 4. In a modified form shown in FIG. 2, sector rods 33a and 34a are provided with stops 40 and 41, respectively, and the rods are secured to the sector bell by means of nuts 37 and 38, respectively, which are pulled down against the stops with the nuts. The stops are portions which may be integrally attached to the sector rods or they may be jam nuts which are pulled down tight as far as they will go on the threads of the sector rod or nuts prepositioned on the threaded portions of the rod. In any event, the stops provide for securing the sector rod tightly to the sector bell. The sector body members are held in position without being compressed against the bell.

The upper ends of the rods 33 and 34, not shown, may be provided with a similar stop arrangement as the lower ends to prevent pulling down too tightly on the sector portions. The sector rods may be provided with stops which may be an integral portion (such as 40 and 41) or may be jam nuts mounted on the rod threads or prepositioned so as to maintain a predetermined distance between the upper and lower stops. A bag clamp 44 is placed over the sector and a nut 45 threaded on the upper end of the rod 34 is pulled down to hold the clamp 44. The sector body is thus positioned between the clamp and the bell with a sufficient distance provided to limit pulling up too tightly on the sector body.

Figure 2:
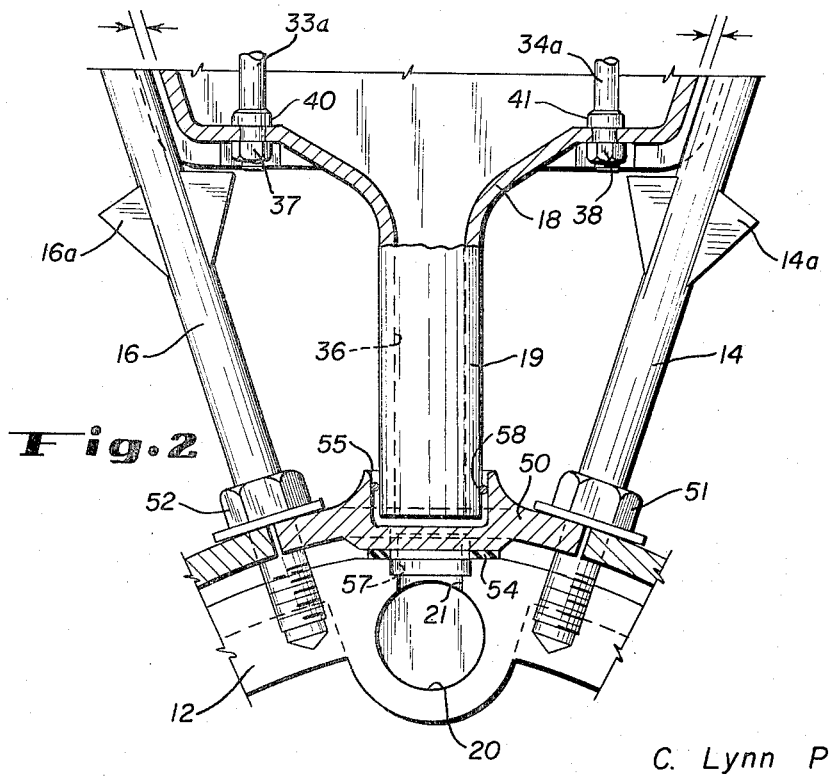
FIG. 2 is a detail of an interconnection between a sector bell and a filter shaft.

The sector assembly with a filter shaft is shown in the enlarged detailed view of FIG. 2. For this purpose a sector is mounted in a seat member 50 which is sealed to the shaft by a flat gasket 54 or a flattened portion of the shaft. The seat member is held in place by the nuts on the radial rods. This may be initially assembled and pulled tight to effect a seal with the flat gasket. Nut and washer assemblies 51 and 52 on the sector rods 14 and 16 secure the seat in place. The radial rods 14 and 16 are threadedly mounted in threaded sockets in the shaft, and the nut and washer assemblies hold the seat and pull it tightly against the gasket 54 forming a seal with the shaft. This construction permits sealing of the flat gaskets before assembly of any sector on the shaft. Thus a shaft seal is insured for every sector. The seat member 50 is provided with a recess 55 into which is telescoped the neck 19 of a sector bell 18. An O-ring seal 58 is mounted on the end of the neck 19 and on inserting the neck in seat the O-ring rolls between the two parts providing a tight seal even under limited reciprocal movement. In some instances a ferrule or short nipple 57 extending from the seat member may extend into the opening in the shaft to hold both the gasket 54 and the seat 50 in proper position over the opening 21 leading to the passageway 20 in the shaft.

Figure 3:
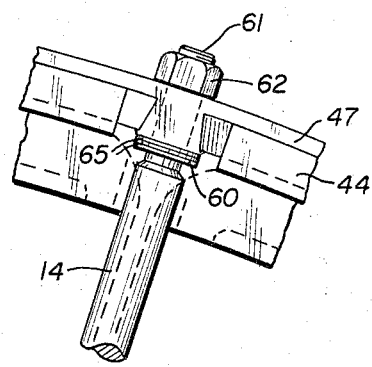
FIG. 3 is a detail of an end of a radial rod and its fastening means.

Each radial rod is provided with a lower stop, as in FIG. 2 stop 14a for rod 14 and a stop 16a for rod 16. The outer end of each radial rod is, also, provided with a stop. For convenience the outer end of a single rod is used for illustration, FIG. 3. The radial rod 14 is provided with a shoulder or stop 60 at its outer end. A plurality of washers 65 may be mounted on the stop 60 and provide a length adjustment for variations of length of sectors. Beyond the stop the radial rod is threaded at 61 for reception of a nut or the like. A sector clamp 47 is mounted on the sector rod 14 and is pulled tight against the stop 60 (with the requisite number of washers) by means of a nut 62 bearing against the clamp 47. The distance along each radial rod between the upper stop and the lower stop is made about ¼" more than the length of the sector itself, which allows floating movement of the sector. A wooden sector swells in width, at right angles to the grain, and this floating movement permits the sector to swell at 90° and move radially taking up the wider space towards the outer end of the radial rods. The width of the sectors are also made so as to leave about ¼" clearance with sector rods on both sides at its innermost point of movement. Thus no matter how tight the nut 62 is screwed against the clamp 47, the sector itself has a limited radial movement within its confines to compensate for swelling and still remains sealed with the shaft. The sector thereby cannot be initially pulled up too tight to cause distortion by later swelling and binding against the neighboring sectors which also are swelling.

A modified form of the invention is illustrated in FIG. 6 wherein a shaft 12a has a threaded opening 57a communicating with a fluid bore 20a. Rods 14 and 16 are threadedly secured in the shaft, as explained above, and each functions in the manner herein set forth. Each rod has lower and upper stops for supporting a sector in limited floating support. For connection to the shaft, however, a short nipple 70 is threaded in the opening 57a and a rubber (or other resilient material) sleeve 71 provides a leak proof seal with the neck 19 of the sector bell. A rubber sleeve and hose clamp arrangement may, also, be used for sealing the bell neck to the shaft. This arrangement, also, forms a seal without the compressive forces on the sector.

Figure 7:
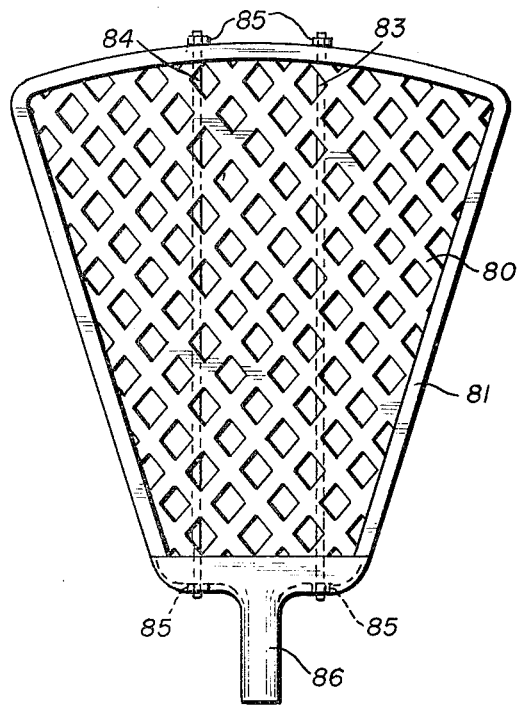
FIG. 7 is a detailed view of a modified filter sector of light weight construction for use with low radial supporting forces.

A modified form of a sector which may be used with the mounting of the invention is shown in FIG. 7, wherein a light weight plastic mesh or grid 80 is held in a channel shaped trim 81. Usually such channels are made of stainless steel for corrosive environments. The channel may be made of light weight material since no compressive forces are necessary to form a seal. The trim 81 is held in a bell 86 by means of rods 83 and 84. Nuts 85 on the two ends of each rod hold the assembly together. The bell may be made of metal, such as stainless steel, etc. The sector is mounted in a manner similar to that described for the sector of FIG. 1, mounted between sector rods with the outlet of the sector sealed by means of a peripheral seal to a passage associated with the shaft. The filter medium may be attached to the sector rods so as to be held in place without radial forces, as described above.

Figure 8:
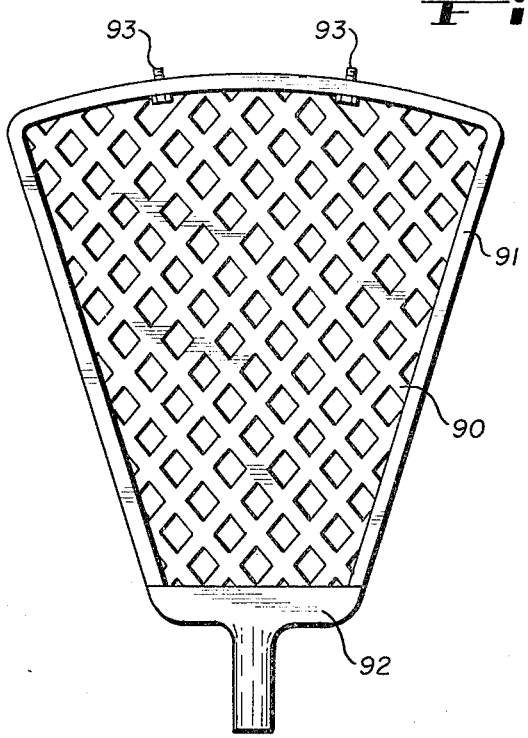
FIG. 8 is a detailed view of another modified filter sector of plastic for use with low radial supporting forces.

An all plastic sector is illustrated in FIG. 8 where a grid 90 is provided with a reinforcing edge 91 extending on both sides and on the top. An outlet 92 is provided with communication to the grid. The parts are all light weight plastic since no radial forces are necessary to form a seal when a sealing arrangement such as FIGS. 2 and 6 are used to connect the outlet of the sector to a shaft. The plastic need only be strong enough to prevent collapsing under suction or blow-back pressure. The sector may be made in one piece, but normally is made in sections and secured together by adhesives, cement, heat sealing, etc. The grids of the sector are all plastic which may be one piece or several secured together. The plastic trim 91 is to insure smooth edges for the filter medium and it is secured to the grid. The outlet 92 is a hollow plastic of a bell shape and it may, likewise, be secured to the grid and the trim, forming a one piece assembly, which does not need to be taken apart. The light weight assembly is readily suspended on the radial rods with the outlet sealed to the shaft as above. A pair of bolts 93 secured in the upper frame member provide means for securing a filter bag clamp to the sector holding a bag type filter medium on the sector, such bags being in common usage.

While the invention has been described with reference to specific details, it is obvious that certain changes may be made which will be readily apparent to those skilled in the art. Thus, while the sector is shown held in a non-compressive position within the radial rods while maintaining a seal with the shaft, the sector body may be held at predetermined positions at the outer ends of the rods with the seal of the sector outlet in the passage associated with shaft intact. Also, the extending outlet of the sector may be made long enough to fit directly in an opening in the shaft, thereby eliminating the need of the separate seat casting. Other changes and modifications are intended to be within the spirit and scope of the invention as defined by the following claims.

I claim:

1. In rotary disc filter construction wherein a plurality of sectors are mounted on a filter shaft in side by side relation to form at least one filter disc the improvement which comprises a plurality of radial uprights secured to the filter shaft and extending outwardly therefrom, a sector including a tubular outlet mounted between each adjacent pair of uprights and extending into said shaft, means associated with each said sector for supporting it for free radial reciprocable motion toward and away from said shaft in position between said pair of uprights, stop means associated with each sector and said adjacent pair of uprights for permitting limited radial movement of the sector, and means including flexible means between each said tubular outlet and said shaft sealing said tubular outlet and said shaft in fluid flow relation during reciprocable movement of said sector and preventing radial compressive forces on said sector at least while said sector is reciprocating toward said shaft, while maintaining a leak proof fluid flow communication therebetween.

2. In rotary disc filter construction wherein a plurality of sectors are mounted on a filter shaft in side by side relation to form at least one filter disc the improvement which comprises a plurality of radially extending uprights secured to the filter shaft, a sector including a tubular outlet reciprocably mounted between each adjacent pair of uprights to reciprocate toward and away from said shaft, each sector including a body portion connected with said tubular outlet, outer and inner stop means associated with each said upright permitting free reciprocable movement of a sector therebetween, each said tubular outlet being reciprocably telescoped in a passage associated with the shaft, and means including peripheral means sealing each said tubular outlet in said passage throughout reciprocating movement of the sector and preventing radial compressive forces on said sector at least while said tubular outlet is reciprocating toward said shaft.

3. Disc filter construction according to claim 2 wherein said peripheral means is an O-ring mounted on said tubular outlet and in said passage.

4. A rotary disc construction according to claim 2 wherein each said sector includes a plastic grid, plastic trim structure secured to said grid and extending a substantial distance around the periphery thereof, and said tubular outlet is a plastic outlet member secured to said grid and the ends of said trim providing an outlet in communication with said grid, said trim and said outlet providing a smooth peripheral edge for said grid.

5. In rotary disc filter construction wherein a plurality of sectors are mounted on the hollow filter shaft in side by side relation to form at least one filter disc the improvement which comprises a plurality of radially directed uprights threadedly attached to a filter shaft at spaced intervals therearound, a passage in the filter shaft between adjacent uprights, an expandable sector including a body and an extending outlet positioned between adjacent pairs of the uprights for limited radial movement therebetween; cap means secured to each said sector, means associated with each said cap for mounting the same on the outer end of each adjacent upright, fastening means arranged to secure said cap and associated sector to the uprights permitting free inward expansion of said sector, said extending outlet telescoped into a passage associated with said hollow filter shaft and arranged for free reciprocal movement therein, and means reciprocally sealing said outlet during reciprocating movement in said passage and preventing radial compressive forces on said sector at least when said sector is inwardly expanding.

6. In rotary disc filter construction wherein a plurality of sectors are mounted on a hollow filter shaft in side by side relation to form at least one filter disc the improvement which comprises a plurality of radially directed uprights threadedly attached to a filter shaft at spaced intervals therearound, a sector including a body and a sector bell having an outlet positioned between adjacent pairs of the uprights, guide means associated with the edges of the sector positioning said sector for reciprocable movement toward and away from said shaft between said uprights, inner and outer stop means mounted on each upright for permitting radial movement of the sector therebetween, seat means mounted on said shaft including a recess communicating with the interior of the hollow shaft, means sealing said seat on said shaft, said outlet of each said sector bell extending into one of said recesses and arranged for reciprocal movement therein, and means reciprocally sealing said oulet in said recess during reciprocable movement and preventing radial compressive forces on said sector at least while said sector is reciprocating toward said shaft.

7. In rotary disc filter construction according to claim 6 wherein the seat means includes fastening means associated with said uprights securing said seat means in position on said hollow filter shaft.

8. In rotary disc filter construction according to claim 6 wherein the means reciprocally sealing each said outlet in a recess is an O-ring seal mounted on the periphery of said outlet and in said recess.

9. The method of mounting a sector on a rotary disc filter shaft which includes fluid flow passages therein which comprises mounting a sector including an attached hollow sector neck for free radial movement of limited extent in radial position extending outwardly from said shaft, mounting the sector neck for reciprocable movement in a passage interconnected with a fluid passage in said shaft, supporting the sector in its radial position for a floating movement so as to permit free expansion and contraction and radial movement of the sector toward and away from the shaft, and reciprocally sealing said sector neck to said shaft to maintain a leak-proof seal during such radial movement of said sector and to prevent radial compressive forces on said sector at least while said sector is moving toward said shaft.

References Cited by the Examiner
UNITED STATES PATENTS

| | | |
|---|---|---|
| 1,293,555 | 2/1919 | Salisbury _____ 210—345 |
| 2,519,203 | 8/1950 | Stoecklin. |
| 2,521,127 | 9/1950 | Price. |
| 2,591,720 | 4/1952 | Peterson _____ 210—345 X |
| 2,781,133 | 2/1957 | Thompson _____ 210—347 X |
| 2,864,503 | 12/1958 | Hunter _____ 210—331 X |
| 2,874,848 | 2/1959 | Cannon et al. ____ 210—347 X |
| 2,876,905 | 3/1959 | Daman _____ 210—331 X |
| 2,894,632 | 7/1959 | Myers _____ 210—331 |
| 2,932,402 | 4/1960 | Logue et al. _____ 210—331 X |
| 2,964,194 | 12/1960 | Oliver et al. _____ 210—347 X |
| 3,193,105 | 7/1965 | Putnam _____ 210—347 X |

FOREIGN PATENTS 213,909    3/1961    Austria.

REUBEN FRIEDMAN, *Primary Examiner.*

D. M. RIESS, *Assistant Examiner.*